US007286960B2

(12) United States Patent
Jammu et al.

(10) Patent No.: US 7,286,960 B2
(45) Date of Patent: Oct. 23, 2007

(54) SYSTEMS AND METHODS FOR MONITORING FOULING AND SLAGGING IN HEAT TRANSFER DEVICES IN COAL FIRED POWER PLANTS

(75) Inventors: Vinay Bhaskar Jammu, Bangalore (IN); Nishith Pramod Vora, Warminster, PA (US); Ravi Yoganatha Babu, Bangalore (IN); Rama Venkata Mahajanam, Radnor, PA (US)

(73) Assignee: General Electric Company, Niskayuna, NY (US)

( * ) Notice: Subject to any disclaimer, the term of this patent is extended or adjusted under 35 U.S.C. 154(b) by 117 days.

(21) Appl. No.: 10/955,117

(22) Filed: Sep. 30, 2004

(65) Prior Publication Data

US 2006/0074591 A1 Apr. 6, 2006

(51) Int. Cl.
*G06F 11/30* (2006.01)
(52) U.S. Cl. .......................................... 702/182; 714/47
(58) Field of Classification Search ................ 702/85, 702/132, 182–185; 700/274–278, 299–300; 714/47–48; 165/276–277; 237/19
See application file for complete search history.

(56) References Cited

U.S. PATENT DOCUMENTS

| 4,669,310 | A |   | 6/1987  | Lester            |         |
|-----------|---|---|---------|-------------------|---------|
| 5,083,438 | A |   | 1/1992  | McMullin et al.   |         |
| 5,280,756 | A |   | 1/1994  | Labbe             | 110/191 |
| 5,311,421 | A |   | 5/1994  | Nomura et al.     | 700/37  |
| 5,333,240 | A |   | 7/1994  | Matsumoto et al.  | 706/20  |
| 5,363,693 | A |   | 11/1994 | Nevruz            | 73/40   |
| 5,367,470 | A | * | 11/1994 | Lang              | 700/274 |
| 5,480,298 | A |   | 1/1996  | Brown             | 431/79  |
| 5,590,706 | A |   | 1/1997  | Tsou et al.       |         |
| 5,790,420 | A |   | 8/1998  | Lang              | 700/287 |
| 5,845,272 | A |   | 12/1998 | Morjaria et al.   | 706/50  |
| 6,023,070 | A |   | 2/2000  | Wetegrove et al.  | 250/573 |

(Continued)

FOREIGN PATENT DOCUMENTS

EP            0155826        9/1985

(Continued)

OTHER PUBLICATIONS

Carl S. Byington, Michael J. Roemer, and Thomas Galic, Prognostic Enhancements to Diagnostic Systems for Improved Condition-Based Maintenance, 2002 IEEE, pp. 6-2815 thru 6-2824.

(Continued)

*Primary Examiner*—Carol S. W. Tsai
*Assistant Examiner*—Mary Catherine Baran
(74) *Attorney, Agent, or Firm*—Fletcher Yoder

(57) ABSTRACT

A system for isolating effects of one or more process parameters on performance of a heat transfer device is provided. The system includes an efficiency correction unit that is adapted to receive data from the heat transfer device. The data is representative of one or more measurable process parameters or a change in the one or more measurable process parameters of the heat transfer device. The efficiency correction unit is also configured to compute a normalized efficiency of the heat transfer device. The normalized efficiency represents a corrected efficiency that isolates effects of one or more process parameters on performance of the heat transfer device.

21 Claims, 5 Drawing Sheets

U.S. PATENT DOCUMENTS

Figure 1:
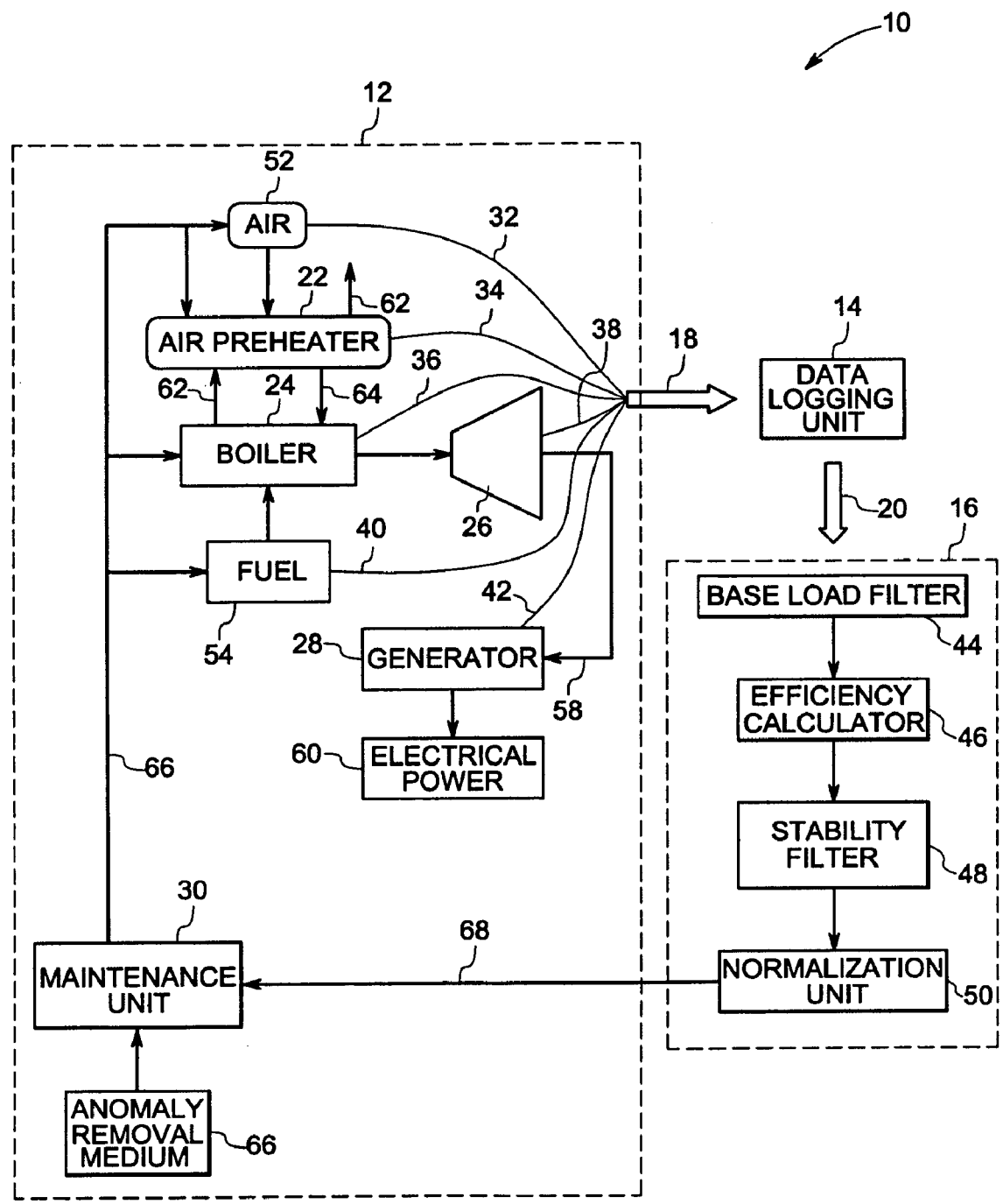

| | | | |
|---|---|---|---|
| 6,136,281 A | 10/2000 | Meischen et al. ............ 423/210 |
| 6,163,740 A * | 12/2000 | Beltracchi .................... 700/286 |
| 6,226,597 B1 | 5/2001 | Eastman et al. |
| 6,289,299 B1 | 9/2001 | Daniel, Jr. et al. |
| 6,485,578 B1 | 11/2002 | Park et al. |
| 6,507,774 B1 | 1/2003 | Reifman et al. ............. 700/274 |
| 6,522,994 B1 | 2/2003 | Lang .......................... 702/183 |
| 6,651,035 B1 * | 11/2003 | Lang .......................... 702/183 |
| 6,799,146 B1 * | 9/2004 | Lang .......................... 702/183 |
| 7,113,888 B2 * | 9/2006 | Nagano et al. ............. 702/182 |
| 2002/0168302 A1 | 11/2002 | Pahlman et al. ............ 422/171 |
| 2002/0197199 A1 | 12/2002 | Fan et al. .................... 423/430 |
| 2003/0007900 A1 | 1/2003 | Shimizu et al. ............. 422/169 |
| 2003/0019221 A1 | 1/2003 | Rossi et al. |
| 2003/0065481 A1 * | 4/2003 | Fujishima et al. .......... 702/182 |
| 2006/0020420 A1 * | 1/2006 | Vesel ......................... 702/182 |
| 2006/0041335 A9 * | 2/2006 | Rossi et al. ................. 700/276 |

FOREIGN PATENT DOCUMENTS

EP            1443375          8/2004

OTHER PUBLICATIONS

B. Widarsson, C. Karlsson, and E. Dahlquist, Bayesian Network for Decision Support on Soot Blowing Superheaters in a Biomass Fuelled Boiler, Iowa State University, Sep. 2004, pp. 212-217.

A. Valero and C. Cortes, Ash Fouling in Coal-Fired Utility Boilers Monitoring and Optimization of On-Load Cleaning, Prog. Energy Combust. Sci. 1996, vol. 22, pp. 189-200.

S. Thompson and N. Li, Boiler Soot-Blowing Optimisation for Power Generation Plant, The Queen's University of Belfast, UK, pp. 1277-1282.

* cited by examiner

SYSTEMS AND METHODS FOR MONITORING FOULING AND SLAGGING IN HEAT TRANSFER DEVICES IN COAL FIRED POWER PLANTS

BACKGROUND

The invention relates generally to power plants and power generation equipment. More particularly, the invention relates to techniques for monitoring heat transfer devices of various types in power plants or similar installations.

Power plants and power generation equipment play a significant role in the current economy. The demand for electrical power has never been greater, and it has been estimated that in the coming years the demand will continue to increase. Power plants are typically classified based on the process of electrical power generation. Examples of types of power plants include thermal power plants, hydroelectric power plants, nuclear power plants, geothermal power plants, wind farms, and solar farms. Each generating modality operates with a specific and different input and produces an electrical power output. In most power plants, heat transfer devices such as furnace firewalls, air preheaters, superheaters, reheaters, economizers, and so forth are used to transfer heat from one medium to another medium in order to maintain a continuous generation of electrical power.

When the heat transfer devices function, there are a number of processes that take place. Typically, these processes may produce undesired by-products that can subsequently hinder the functioning of the processes. As a result, the efficiency of the power plant decreases with time and overall cost of operation of the power plant increases. Boilers, for example, form an integral part of any power plant that uses combustion to generate steam to run turbines. Boilers generate steam by heating a liquid medium, typically by combustion of a fuel. Common types of fuel used to fire boilers include coal and fuel oil. Due to chemical by products released during combustion and incomplete combustion, the boilers commonly suffer from fouling and slagging.

Fouling is the accumulation of ash and by products of incomplete combustion as a layer on the inner surface of a boiler. A layer of fouling substance typically has low thermal conductivity that reduces the amount of heat transferred in heat exchanging components. In the case of a boiler, this causes an overall increase in temperature inside the boiler for a given amount of steam production, a decrease in functional efficiency of the boiler, and an increase in pressure drop within the boiler due to reduced cross-sectional area. Slagging is a process that is quite similar to fouling. Slagging refers to deposition of solid or molten layers on the outside surface of the boiler tubes. Such layers are formed by a process commonly known as sintering. Sintering is the bonding of adjacent surfaces of particles into a hard deposit. Sintering subsequently strengthens the mass, causing an increase in tenacity of the deposit on the surface. Both fouling and slagging are self-propelling processes, meaning that once an initial layer of a material forms on a surface, the layer causes more of the material to be deposited.

Another of the components used for heat transfer in power plants and similar installations is an air preheater. The air preheater typically transfers heat from re-circulating flue gases to air. The outgoing flue gases from a combustion process are used to pre-heat air that could be used in other processes. The pre-heating of air reduces the amount of energy spent in raising the temperature of an otherwise cold air to a desired temperature level. Because these flue gases contain organic and inorganic chemicals, the flue gases react with metal tubes disposed within the air preheater and cause corrosion and fouling.

Due to effects as described above, performance of these components drops significantly over time and ultimately causes a breakdown or an expensive forced outage. Addition of chemicals to the fuel and treating the device surface is a common way of reducing the effects of fouling and slagging. The addition of chemicals can be an expensive process and also is time consuming. The existing systems that monitor boilers are typically what can be termed as reactive warning systems. This means that the systems would raise an alarm or warning only when a problem affects the boilers or other heat transfer devices. By the time the alarm is raised, the effects of fouling and slagging typically have progressed to a severe stage that leaves system operators with little option other than to shutdown the boiler for cleaning and/or treating the heat transfer surfaces to bring the boiler performance to acceptable limits. Also, such reactive warning systems generally are incapable of predicting when a failure of the boiler might occur. In many cases, evaluation relies instead on the operator experience and knowledge of boiler performance to predict an impending failure.

There is, therefore, a need for an active warning system that consistently and continuously monitors the performance of heat transfer devices and alerts a system operator of an impending problem, not when the problem has occurred but when the problem is actually at its initiation phase, and is also able to predict more accurately when a device failure might occur. With such an early warning, maintenance of heat transfer devices would be easier and would require lower levels of chemicals to treat the devices and fuel, leading to a longer operating life and a significant reduction in maintenance costs.

BRIEF DESCRIPTION

In accordance with one aspect of the present technique, an exemplary system for isolating effects of one or more process parameters on performance of a heat transfer device is provided. The system includes an efficiency correction unit that is adapted to receive data from the heat transfer device. The data is representative of one or more measurable process parameters or a change in the one or more measurable process parameters of the heat transfer device. The efficiency correction unit is also configured to compute a normalized efficiency of the heat transfer device. The normalized efficiency represents a corrected efficiency that isolates effects of one or more process parameters on performance of the heat transfer device.

In accordance with another aspect of the present technique, an exemplary system for incipient detection of one or more anomaly conditions in a heat transfer device includes an analysis module adapted to receive data from the heat transfer device and configured to compute at least one performance indicator based upon the received data. The data represents at least one of a measurable process parameter or a change in at least one of the measurable process parameters in the heat transfer device.

DRAWINGS

Figure 2:
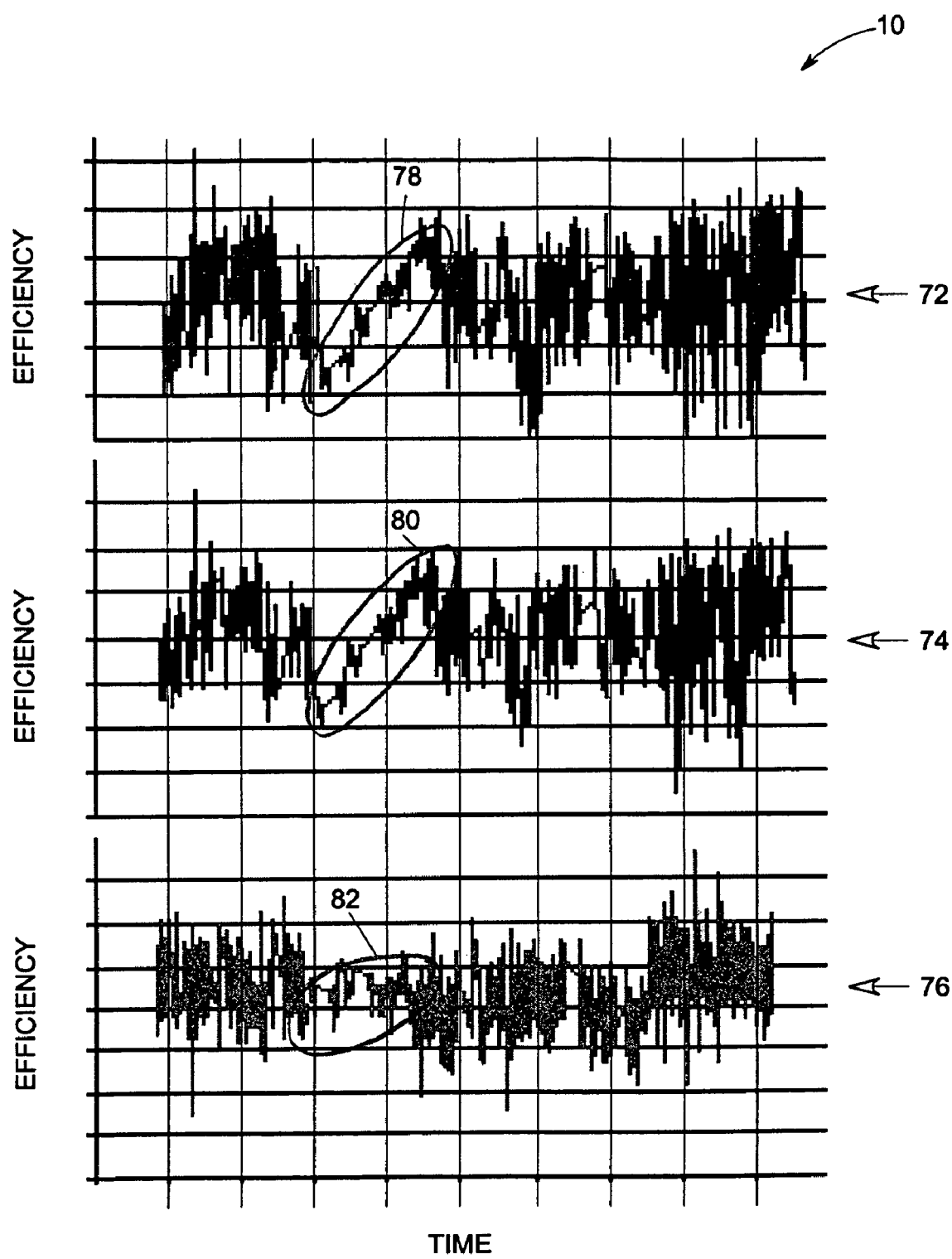
Figure 3:
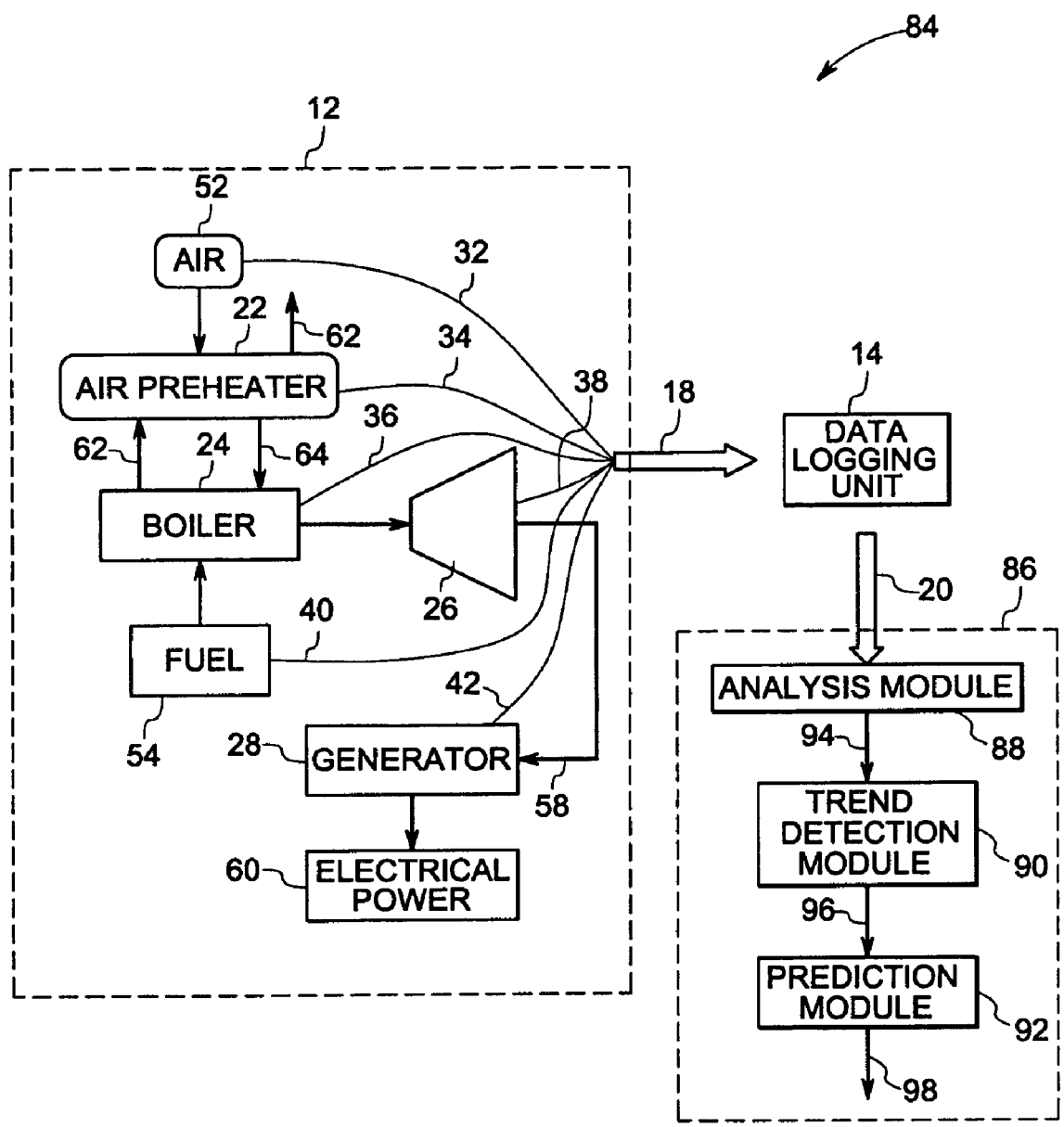
Figure 4:
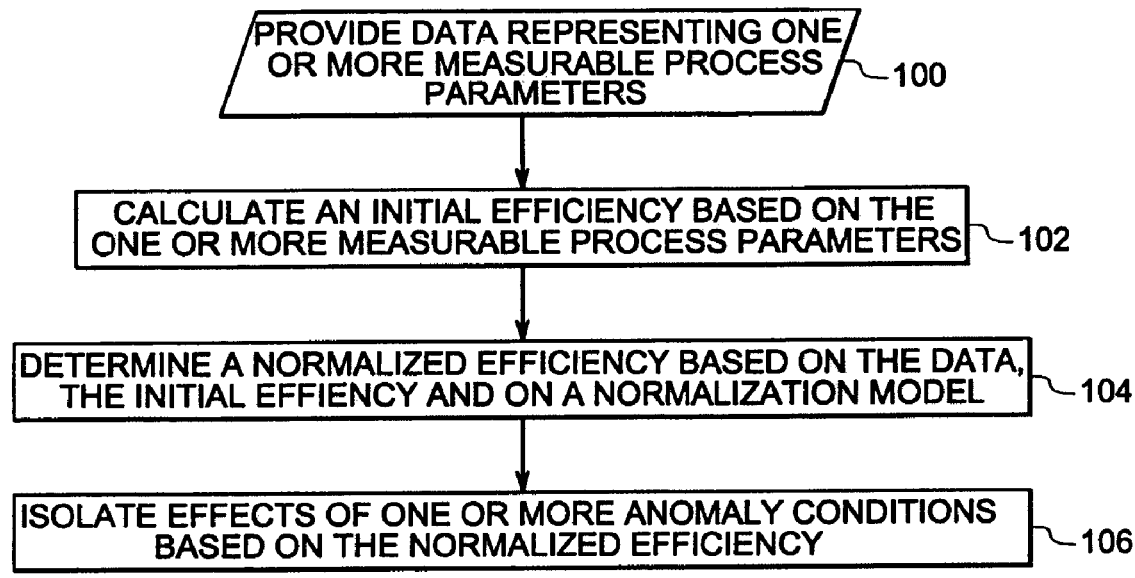
Figure 5:
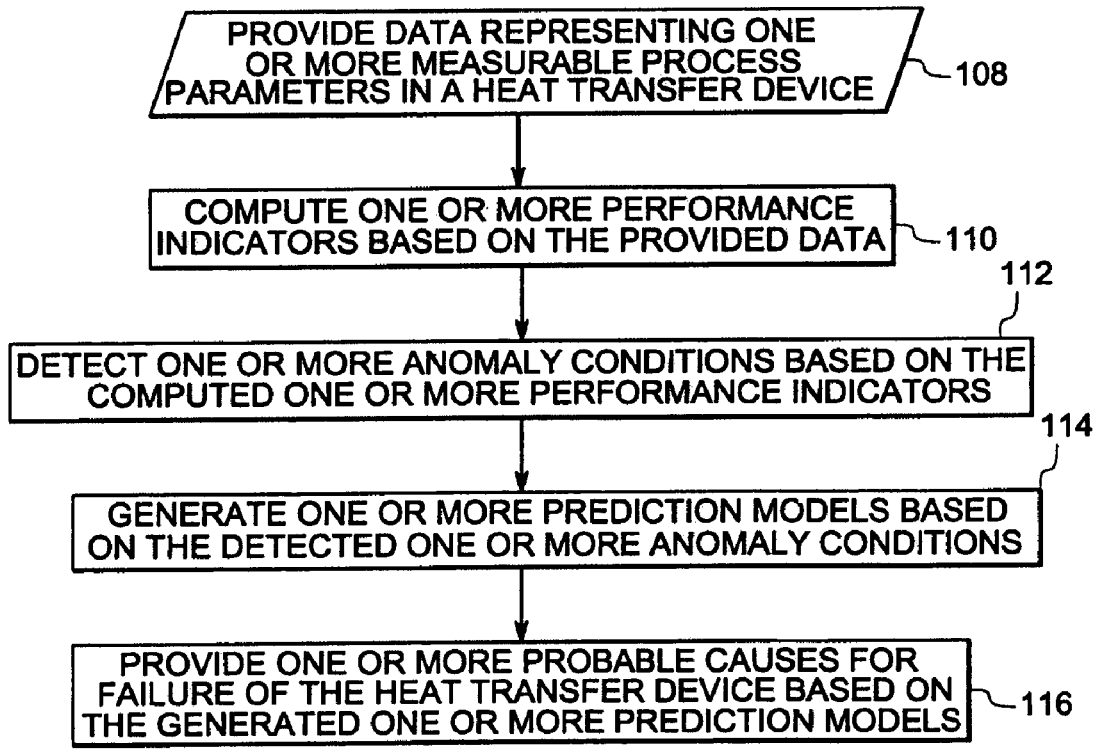
Figure 6:
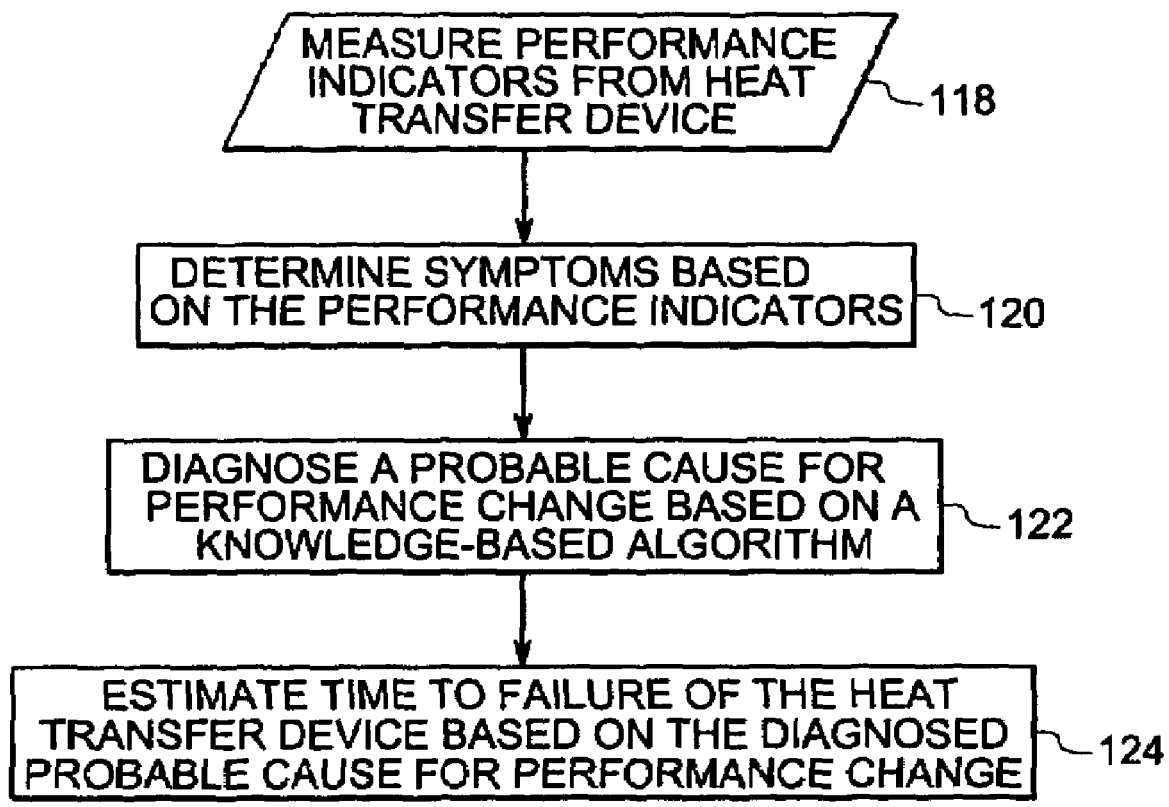

These and other features, aspects, and advantages of the present invention will become better understood when the following detailed description is read with reference to the accompanying drawings in which like characters represent like parts throughout the drawings, wherein:

FIG. 1 diagrammatically illustrates an efficiency correction system for isolating effects of one or more anomaly conditions as applied to an exemplary power plant in accordance with an exemplary embodiment of the invention;

FIG. 2 diagrammatically illustrates verification of the exemplary efficiency correction system as illustrated in FIG. 1;

FIG. 3 diagrammatically illustrates a system for incipient detection of one or more anomaly conditions in a heat transfer device in an exemplary power plant in accordance with another exemplary embodiment of the invention;

FIG. 4 diagrammatically illustrates a method for isolating effects of one or more anomaly conditions as applied to the power plant of FIG. 1;

FIG. 5 diagrammatically illustrates a method for incipient failure detection of a heat transfer device in the power plant of FIG. 3; and FIG. 6 diagrammatically illustrates a method for estimating time to failure of a heat transfer device via a knowledge-based algorithm in accordance with another exemplary embodiment of the invention.

DETAILED DESCRIPTION

Referring to FIG. 1, an exemplary embodiment of an efficiency correction system 10 as applied to a power plant 12 is schematically represented as including the power plant 12, a data logging unit 14, an efficiency correction unit 16, a first communication link 18 between the power plant 12 and the data logging unit 14, and a second communication link 20 between the data logging unit 14 and the efficiency correction unit 16.

The illustrated power plant 12 includes an air preheater 22, a boiler 24, a steam turbine 26, a generator 28, and a maintenance unit 30. The data logging unit 14 is adapted to monitor and measure one or more process parameters, shown generally by reference numerals 32 through 42 from any of the above specified components, such as the air preheater 22, the boiler 24, the steam turbine 26, the generator 28, or the maintenance unit 30. Examples of measurable process parameters include a pressure within the boiler 24, a pressure difference between an input and output of air from the air preheater 22, a difference in temperature between the input and output of air from the air preheater 22, a pressure of steam within the boiler 24, a pressure of water within the boiler 24, a mass flow rate of fuel 54 into the boiler 24, and a mass flow rate of an anomaly reduction medium to the heat transfer devices. The efficiency correction unit 16 in this exemplary embodiment includes a base load filter 44, an efficiency calculator 46, a stability filter 48, and an efficiency normalization unit 50. In other exemplary embodiments of the present technique, there also may be a plurality of the various components as specified above.

As would be appreciated by those skilled in the art, the power plant 12 uses the air preheater 22 to pre-heat an input of air 52 into the boiler 24. Air 52 is used to aid in the supply of oxygen to the boiler 24 to facilitate combustion of a fuel 54 inside the boiler 24. The boiler 24 utilizes the combustion of the fuel 54 to heat water contained in the boiler 24 to beyond its boiling point to generate steam 56. The generated steam 56 is used, in turn, to propel a plurality of turbine blades in the steam turbine 26, wherein the energy of steam 54 is transformed into rotary motion 58. The generator 28 is coupled to the steam turbine 26 to produce electrical power 60 as an output.

The boiler 24 requires air 52 at an elevated temperature, and to achieve that the air 52 is preheated before it enters the boiler 24. Once combustion in the boiler 24 begins, the flue gas 62 released during the combustion can be re-circulated to the air preheater 22 where the flue gas 62 can be used to pre-heat the incoming air 52 into the boiler 24. The pre-heated air 64 enters the boiler 24, while the flue gas 62 leaves the air preheater 22. In certain exemplary cases, the flue gas 62 can be circulated within tubes, while in other exemplary embodiments the flue gas 62 can be passed around tubes through which air is forced. The air preheater 22 and the boiler 24 can be commonly grouped as heat transfer devices. In the discussions that follow, it should be noted that the term 'heat transfer device' refers to one of the air preheater 22, the boiler 24, a furnace, a furnace waterwall, an economizer, a superheater, a reheater or their combinations.

Performance of the power plant 12 is measured primarily on how much electrical power 60 the power plant 12 produces for a given quantity of fuel 54. There are a variety of factors that influence the performance of the power plant 12. These include quality of the fuel 54, and capabilities of the heat transfer devices. Quality of the fuel 42 further depends on the type of fuel 54 used, the heating value of the fuel 54, the moisture content in the fuel 54, the ash content in the fuel 54, and the residual deposits from the fuel 54 following combustion. Capability of the boiler 24 is typically dependent on at least one of a heating capacity of the boiler 24, pressure confining capacity of the boiler 24, temperature rating of the boiler 24, and water storage capacity of the boiler 24. Capability of the air preheater 22 also depends on chemical composition of the flue gas 62 released during combustion, pressure generated inside tubes in the air preheater 22, and temperature rating of the air preheater 22.

In practice, however, the efficiency of the power plant 12 may depend on many more factors other than those previously described. For example, flue gas 62 released during combustion in a boiler 24, additives added to the water, additives added to the surface of the boiler 24, metallic tubes and structures in the air preheater 22 or the boiler 24 may chemically react with the various structures in the boiler 24 to create one or more anomaly conditions that interfere in the functioning of the boiler 24. The air preheater 22 may also suffer from a similar effect of reaction of flue gas 62 with metallic tubes and structures inside the air preheater 22, and also between the flue gas 62 and any heat exchanging medium within the air preheater 22. While each of the above described interactions produces useful work, they also hinder the functioning of the heat transfer devices.

Commonly occurring anomaly conditions within the heat transfer devices include the effects of fouling and slagging.

In one exemplary embodiment of the invention, the efficiency correction unit 16 is used to proactively isolate the effects of one or more process parameters on the performance of the heat transfer device. In other implementations, the efficiency correction unit 16 may also be used to isolate the effects of one or more anomaly conditions during the onset of the anomaly conditions. The efficiency correction unit 16 computes a normalized efficiency by determining a normalized efficiency 68, and this normalized efficiency 68 is then used to provide a more accurate addition of anomaly reduction medium 66 to the heat transfer devices 22, 24 and to the various other units in the power plant 12. The anomaly reduction medium 66 may include deposit conditioning additives, combustion catalysts, reflectivity modifiers, or their various combinations and derivatives. Examples of deposit conditioning additives include magnesium based slurries like FuelSolv FMG2960, FuelSolv FMG8420. Examples of combustion catalysts like FuelSolv CEC2567 and FuelSolv CEC3110. Examples of reflectivity modifiers include sodium based powders like FuelSolv FS3954. The addition of the anomaly reduction medium 66 via the present technique is particularly advantageous since it preempts one or more anomaly conditions and provides early detection leading to sparse usage of the medium 66, thus adding to efficiency of the unit and preventing any side effects of the medium 66.

When the heat transfer devices 22, 24 function, a plurality of process parameters depicted generally by reference numerals 32-42 are measured as data. Such data are sampled and collected by the data logging unit 14 via the first communication link 18. In certain other exemplary embodiments of the present technique, the data logging unit 14 may also include a plant information (PI) system. The data logging unit 14 may sample the data from the various units via sensors placed in and around the heat transfer devices 22, 24 at appropriate locations. Examples of sensors include a pressure sensor, a temperature sensor, and a mass flow rate sensor. Typical periods for sampling data from the heat transfer devices 22, 24 may vary from about 5 minutes to about 10 hours. The first communication link 18 linking the power plant 12 to the data logging unit 14 may include a wired link when the data logging unit 14 is located in the vicinity of the power plant 12 or a wireless, radio-frequency link when the data logging unit 14 is located beyond the vicinity of the power plant 12. The efficiency correction unit 16 is linked to the data logging unit 14 via a second communication link 20. Similar to the first communication link 18, the second communication link 20 may be a wired link or a wireless link as needed.

The base load filter 44 is used to remove the effects of transient conditions caused due to a varying load on the power plant 12. Base load may be defined as the condition when the power plant operates under design conditions and produces the rated power. Demand for electricity typically varies from hour to hour in most commercial and industrial areas. It is quite typical that demand for electrical power continuously changes. Still, the power plant 12 is only capable of supplying a certain amount of electrical power 60. A varying load condition is partially, but certainly, responsible for causing variation in the efficiency of the power plant 12 and the base load filter 44 is adapted to reduce the effects of such variations in determining the efficiency of the power plant 12.

The efficiency calculator 46 calculates an initial efficiency of the heat transfer devices 22, 24. In one exemplary case, the initial efficiency is calculated using an output-loss method, but any other known method for efficiency calculation is equally applicable. The output loss method is an extension of the heat loss method as prescribed by the American Society of Mechanical Engineers (ASME) Performance Test Code 4.0. The principle of the output loss method is that an input to the heat transfer device comprises output from the heat transfer device and losses in the heat transfer device. For example, input variables to the boiler 24 may include at least one of a mass flow rate M of fuel 54 and a calorific value H of the fuel 54. The output from the boiler 24 is the amount of heat Q transferred to the water contained in the boiler 24 to produce steam. Therefore, the efficiency $\eta$ of the boiler 24 may be symbolically and ideally be represented as:

$$\text{Efficiency of the boiler unit}: \eta = \frac{\text{Output}}{(\text{Output} + \text{Losses})} \quad \text{(Eq. 1)}$$

Apart from the above-specified variables, the efficiency of the boiler 24 may also depend on moisture content of air 38, moisture content in the fuel 54, and heat loss due to onset of fouling and slagging conditions and these factors need to be considered while computing an efficiency of the boiler 24.

The stability filter 48 comprises one or more stability filters adapted from the standards specified by the ASME. The stability filter 48 is responsible for enforcing stability regulations for temperature and pressure variations as specified in the ASME Performance Test Code 4.0. For example, the standards state that for stable operation of a boiler, maximum variation of temperature and pressure should be within a certain tolerable range. The standards also allow the range to vary with application of the boiler. In accordance with certain aspects of the present technique, the stability filter 48 limits data to specify a temperature variation of less than 20 degrees Fahrenheit (F.) and a pressure variation of less than 20 pounds per square inch (PSI). The purpose of incorporating the stability filter 48 is to limit the sampled data to data that represents stable operation and to avoid any miscalculation of efficiency due to improper data that may be termed as outliers or rare occurrences. The function of the stability filter 48 may be represented symbolically as:

$$\text{Max } [P_{MS}(t):P_{MS}(t+1 \text{ hour})] - \text{Min } [P_{MS}(t):P_{MS}(t+1 \text{ hour})] < 20 \text{ PSI} \quad \text{(Eq. 2)}$$

$$\text{Max } [T_{MS}(t):T_{MS}(t+1 \text{ hour})] - \text{Min } [T_{MS}(t):T_{MS}(t+1 \text{ hour})] < 20 \text{ F} \quad \text{(Eq. 3)}$$

where, $P_{MS}$ represents main steam pressure in the boiler 24 and $T_{MS}$ represents a main steam temperature in the boiler 24. Equation 2 specifies that for pressure variation in the boiler steam pressure to be classified as stable, the pressure variation should not be more than 20 PSI in a time period of 1 hour. Equation 3 specifies that for the temperature variation in the boiler to be classified as stable, the temperature variation should not be more than 20 degrees F. in a time period of 1 hour. The time period of 1 hour may be changed accordingly to suit various desired stability levels. While the indicated values of 20 PSI and 20 degrees F. are exemplary values for used validating the present technique, the values of pressure and temperature stability levels may be altered as desired for any particular device operation.

Once the data sampled from the power plant 12 has been classified as representing stable operation, a normalized efficiency ($\eta^*$) for the power plant 12 based on the initial efficiency ($\eta$) is computed. A form of the normalization model is used to compute the normalized efficiency, wherein the normalization model depends on the measured and design values for at least one of the following factors: the main steam pressure, the higher heating value of the fuel, the mass flow rate of the fuel, the cold reheat pressure of the steam, the cold reheat pressure of the air, and the gross power output from the steam turbine. The normalization efficiency may symbolically be represented as:

$$\eta^* = \eta - c0 + c1\left(\frac{HHV}{HHV^*}\right) + c2\left(\frac{Mf}{Mf^*}\right) + \quad \text{(Eq. 6)}$$

-continued
$$c3\left(\frac{Pms}{Pms^*}\right) + c4\left(\frac{Pcro}{Pcro^*}\right) + c5\left(\frac{Pcra}{Pcra^*}\right) + c6\left(\frac{Pg}{Pg^*}\right)$$

where η is the initial efficiency of the boiler unit, HHV and HHV* are the measured and the specified higher heating value of the fuel, Mf and Mf* are the measured and the specified mass flow rate of the fuel, Pms and Pms* are the measured and the specified main steam pressure inside the boiler unit, Pcro and Pcro* are the measured and the specified cold reheat pressure, Pcra and Pcra* are the measured and the specified attemperator pressure in the boiler unit, and Pg and Pg* are the measured and specified gross power generated by the generator coupled to the turbine unit. Attemperation is the process by which final temperature of steam from the boiler is controlled by spraying water or steam at a lower temperature on the steam generated inside the boiler. All the specified values for the various terms in the above equation are the design specifications of the various components that comprise the power plant 12.

The computation of the normalized efficiency results in reduction in the variation of efficiency. FIG. 2 illustrates evidence 70 of the validation of the present technique. FIG. 2 includes three plots 72, 74 and 76 which represent variation of efficiency (represented by the vertical axis) with time (represented by the horizontal axis). Plot 72 represents change in the initial efficiency in a heat transfer device with time. Region 78 represents a first variation of efficiency. Plot 74 represents the efficiency of the heat transfer device after the sampled data has been passed through the stability filter 48 illustrated in FIG. 1. It may also be noted that the efficiency of the heat transfer device shows less variation, indicated by region 80. Finally, plot 76 represents the variation of normalized efficiency with time and region 82 provides evidence of decreased deviation in efficiency of the heat transfer device once the efficiency and data from the heat transfer device has been normalized.

The reduced variation also allows for a better understanding of effects of anomaly conditions such as fouling and slagging on the performance of the heat transfer device. Based on the better understanding of the effects of the anomaly conditions, a system operator can provide the anomaly reduction medium 66 via the maintenance unit 30 to the boiler 24, the fuel 54, the water in the boiler 24, the furnace in the boiler 24, and the tubes of the air preheater 22 well in advance and prevent the onset of the anomaly conditions. Such an early and proactive step of reducing the occurrence of the anomaly conditions also results in a reduced usage of the anomaly reduction medium 66, lessening the maintenance cost of the power plant 12. The above embodiment has been mainly explained with the boiler 24 as an example. The present technique may be applied in an equally effective way for various other types of heat transfer devices, like air preheaters and super heater units.

FIG. 3 diagrammatically illustrates an exemplary system 84 for incipient detection of at least one anomaly condition in a power plant 12, as illustrated and described previously. Apart from the power plant 12, the data logging unit 14, and the first and the second communication links 18, 20 respectively, the exemplary system 84 also includes an incipient detection module 86 that includes an analysis module 88, a trend detection module 90, and a prediction module 92.

The analysis module 88 is adapted to receive data representing one or more measurable process parameters represented by reference numerals 32-42 (FIG. 1) from the power plant 12 and to compute at least one performance indicator 94 based on the received data. For example, in the case of an air preheater 22, the inputs to the air preheater 22 would be in the form of air 52 and hot flue gas 62 from the combustion process in the boiler 24. The inputs have a pressure and a temperature associated with them. Similarly, the output from the air preheater 22 is air 64 at an elevated temperature, and relatively cooler flue gases at a certain output temperature and pressure associated with each of the outputs. While sampling data from the air preheater 22, the above specified variables are taken as the pertinent data and used to compute one or more performance indicators 94. In the case of the air preheater 22, typical performance indicators include an efficiency factor, an effectiveness factor, a difference in flue gas pressure, a difference in air pressure, and a temperature difference either on a normal scale or on a logarithmic scale.

$T_{gi}$, $T_{go}$, $T_{ai}$, $T_{ao}$ in the below equations represent the input and outlet temperatures of flue gas and air respectively, and $P_{gi}$, $P_{go}$, $P_{ai}$, $P_{ao}$ represent the input and output pressures of flue gas and air respectively. The analysis module 88 computes each of the performance indicators 94 specified above based on the equations indicated below:

$$\text{Efficiency factor} = \frac{T_{gi} - T_{go}}{T_{gi} - T_{ai}} \quad \text{(Eq. 7)}$$

$$\text{Effectiveness factor} = \frac{T_{ao} - T_{ai}}{T_{gi} - T_{ai}} \quad \text{(Eq. 8)}$$

$$\text{Difference in gas pressure, Gas } \Delta P = P_{gi} - P_{go} \quad \text{(Eq. 9)}$$

$$\text{Difference in air pressure, Air } \Delta P = P_{ai} - P_{ao} \quad \text{(Eq. 10)}$$

$$\text{Log Mean Temperature Difference} = \frac{(\{T_{gi} - T_{ao}\} - \{T_{go} - T_{ai}\})}{\ln(\{T_{gi} - T_{ao}\}/\{T_{go} - T_{ai}\})} \quad \text{(Eq. 11)}$$

where ln represents a natural logarithm.

It should be noted that for the air preheater 22, the input flue gas temperature $T_{gi}$ would be higher than the output flue gas temperature $T_{go}$. However, because the air absorbs a part of heat from the flue gas, the input temperature of air $T_{ai}$ would be relatively lower than the output temperature of air $T_{ao}$ from the air preheater 22.

The trend detection module 90 takes one or more of the computed performance indicators 94 and verifies whether the performance indicators 94 represent a stable operation. The tolerance limit for determining stable operation may be provided by a system operator to the system or it could be an inherent part of the trend detection module 90 itself. Trend detection may be performed through trend estimation, hypothesis testing, or exponential filtering or by their any combination.

Trend estimation is a technique where a series of measurement of process parameters from a heat transfer device represent a time series and statistical techniques are applied to the time series to make and justify statements made on detected trends in the time series. This technique is particularly useful when the process is incompletely understood in order to make a valid prediction or generation of a trend model based on the time series of measurements.

Hypothesis testing is another procedure that enables a system operator to determine whether a particular detected anomaly condition is due to a specific measured process parameter or not. The primary focus of this procedure is to rule out chance as a cause for occurrence of the particular anomaly condition. Hypothesis testing starts, in principle, with a null hypothesis and an alternate hypothesis. The null hypothesis specifies that a user does not see a difference in the particular anomaly condition caused by one or more process parameters. The alternate hypothesis states otherwise.

The trend detection module 90 provides information 96 on any anomaly condition present based on the trend detection and validation performed. Equations representing various physics based models to compute a trend may be symbolically represented as follows:

$$\mu_r(t) = \{\Sigma \Delta P(t)\}/\tau \quad \text{(Eq. 12)}$$

$$\text{Null Hypothesis: } \mu_r(t) = \mu_r(t-1) \quad \text{(Eq. 13)}$$

$$\text{Alternate Hypothesis: } \mu_r(t) \neq \mu_r(t-1) \quad \text{(Eq. 14)}$$

wherein $\mu_r(t)$ represents a lognormal distribution, and t, a time period.

The information 96 is fed to a prediction module 92. The prediction module 92 analyzes the one or more anomaly conditions and generates a prediction model 98 that provides information such as time to outage. Based on the prediction model 98, a system operator may decide what would be an appropriate time to provide and schedule maintenance to prevent an occurrence of any failure based on the detected anomaly condition. Such proactive maintenance results in reduction of usage of the anomaly reduction medium. Also, such maintenance results in longer system life and improved efficiency of the system in its entirety. Exemplary prediction modules 98 include calculation of a change in pressure at a later point in time, based on the present change in pressure. With such an exemplary prediction model, it is possible to compute an exemplary time to outage for the air preheater 22. The exemplary prediction model 98 and computation of time to outage may symbolically be represented as:

$$\Delta P(t+n) = \mu_r(t) * (t+n) + c \quad \text{(Eq. 15)}$$

$$\text{Time to Outage } (t) = \frac{\beta - \Delta P(t)}{\mu_r(t)} \quad \text{(Eq. 16)}$$

where β is a constant, which when reached determines that the heat transfer device, the air preheater 22 in this example, has failed. More particularly, equation 16 specifies how long the heat transfer device would take to reach from $\Delta P(t)$ to β given a rate of increase in pressure of $\mu_r(t)$.

Next will be described a method for isolating the effects of one or more anomaly conditions in an exemplary power plant and a method for incipient detection of one or more anomaly conditions.

FIG. 4 illustrates an exemplary method for isolating the effects of one or more anomaly conditions in the power plant 12 via the system 10 (FIG. 1). The method involves the steps of providing data, at step 100, representing one or more measurable process parameters from the power plant 12 to an efficiency correction unit 16 via a data logging unit 14. The data may be provided continuously from the heat transfer devices and other units in the exemplary power plant to the efficiency correction unit 16 or it can be provided to the efficiency correction unit 16 as previously recorded data. Once the data is provided to the efficiency correction unit 16, the following events occur: calculating an initial efficiency η, at step 102, based on the provided data; determining a normalized efficiency η*, at step 104, based on the initial efficiency η and on a normalization model via the normalization unit; and, isolating the effects of one or more anomaly conditions, at step 106, based on the determined normalized efficiency η*.

FIG. 5 illustrates an exemplary method for incipient failure detection the heat transfer device based on the system described and illustrated in FIG. 2. Data representing one or more measurable process parameters in the heat transfer device is provided at step 108 to the analysis module 88 (FIG. 3). In one embodiment of the present technique, the data from the heat transfer device may be provided continuously in real-time or near real-time. The data logging unit 14 may collect the data. In other exemplary embodiments of the present technique, a plant information system could be used to track and measure the one or more measurable process parameters. This results in an instantaneous evaluation of the heat transfer device. In other embodiments of the present technique, the data may be collected and recorded. Using suitable means, the recorded data may be provided at a later period in time for further evaluation and analysis of the heat transfer device. Once the data is received, the system 10 performs the remaining sequence of steps of computing one or more performance indicators, at step 110, based on the provided data; detecting, at step 112, one or more anomaly conditions based on the computed one or more performance indicators; generating, at step 114, one or more prediction models based on the detected one or more anomaly conditions; and finally, providing, at step 116, one or more probable conditions for failure of the heat transfer device at a later point in time.

In another exemplary embodiment of the present technique, it is also possible to diagnose performance degradation of the heat transfer device via a knowledge-based network. Examples of heat transfer devices have been illustrated and described previously. An example of a suitable knowledge-based network is a cause and effect network. The cause and effect network includes the Bayesian network, also commonly known as the Bayesian Belief Network (BBN). The BBN is a belief network that is built upon existing knowledge based on occurrences of certain conditions in the past, experimental results and factual field information gathered from the heat transfer device itself. For a proper diagnosis and estimate of a time to failure, a Bayesian network provides a many-to-many relationship between the failure modes, states of operation of the heat transfer device, and observed symptoms in the heat transfer device. A Bayesian network is a sub-class of a cause-effect network that has been used predominantly for diagnosis in a variety of fields and should be considered as an exemplary case. Any other network representative of the cause and effect network may be used in place of the BBN.

Advantages of using a Bayesian network include a graphical representation of the rules, probabilistic reasoning, an ability to reason in the absence of sensors adapted to measure a plurality of measurable process conditions, and not being required to explicitly state all combinations of rules. The advantages of a Bayesian network provide an excellent reason for application of the technique to estimate a probable time to failure of the heat transfer device. In the exemplary embodiment of the present technique, a Bayesian network has been developed. The Bayesian network includes a failure mode effects analysis (FMEA) providing initial information to the Bayesian network. An exemplary heat transfer device monitored by the Bayesian network would have a plurality of alarms and manual observations which provide information on whether a failure in the heat transfer device is occurring or not. In order to perform a diagnosis of the heat transfer device to truly determine an occurrence of the failure, the Bayesian network applies Bayes' theory to calculate a plurality of probable root causes. In certain implementations of the present technique, an estimate of the time to failure of the heat transfer device is provided based on the Bayes theory which incorporates past occurrences with symptoms that indicated the occurrence and that of an actual recorded failure of the heat transfer device. Apart from being able to estimate time to failure, the Bayesian network can also be used in detecting and isolating failure modes.

FIG. 6 illustrates an exemplary method for estimating time to failure of a heat transfer device via a knowledge-based algorithm. The method involves the steps of measuring, at step 118, process parameters from the heat transfer; computing, at step 120, performance indicators 94 based on the measured process parameters; determining symptoms, at step 122, based on the computed performance indicators 94; diagnosing, at step 124, one or more probable cause for the one or more symptoms via the knowledge-based algorithm; and estimating, at step 126, a time to failure of the heat transfer device based on the one or more probable cause for the one or more symptoms.

In accordance with certain embodiments of present technique, code or blocks of code may be used to perform at least one for an incipient detection of one or more anomaly conditions in the heat transfer device, for predicting a performance degradation over time of the heat transfer device, for an estimation of a time to failure of the heat transfer device, or for isolating the effects of one or more process parameters that affect the performance of the heat transfer device. The various embodiments and aspects already described may comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or flash memory) (magnetic), an optical fiber (optical), and a portable compact disc read-only memory (CDROM) (optical). Note that the computer readable medium may comprise paper or another suitable medium upon which the instructions are printed by mechanical and electronic means or be hand-written. For instance, the instructions can be electronically captured via optical scanning of the paper or other medium, then compiled, interpreted or otherwise processed in a suitable manner if necessary, and then stored in a computer readable memory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for isolating effects of one or more process parameters on performance of a heat transfer device, comprising:
    an efficiency correction unit adapted to receive data representative of at least one measurable process parameter or a change in the measurable process parameter of the heat transfer device, and configured to compute a normalized efficiency of the heat transfer device, wherein the normalized efficiency represents a corrected efficiency that isolates effects of one or more process parameters on performance of the heat transfer device, the efficiency correction unit comprising:
    at least one base load filter adapted to remove effects of a varying load on the heat transfer device, wherein the varying load is configured to utilize an output from the heat transfer device to produce useful work;
    at least one efficiency calculator adapted to compute an initial efficiency of the heat transfer device, wherein the initial efficiency is different from the normalized efficiency; and
    at least one efficiency normalization unit adapted to apply a normalization model to the data to compute the normalized efficiency for the heat transfer device based on the initial efficiency.

2. The system of claim 1, wherein the efficiency correction unit comprises one or more stability filters adapted to validate whether the data is sufficiently stable for application of the normalization model.

3. The system of claim 1, further comprising a data logging unit configured to collect data from the heat transfer device, wherein the data represents at least one measurable process parameter or changes in the measurable process parameter.

4. The system of claim 3, wherein the data logging unit comprises a plant information system.

5. The system of claim 3, wherein the data logging unit samples data from the heat transfer device at periods ranging from about 5 minutes to about 10 hours.

6. The system of claim 1, wherein the measurable process parameter includes a pressure inside the heat transfer device, a temperature inside the heat transfer device, a mass flow rate of the fuel into the heat transfer device, a mass flow rate of air into the heat transfer device, a mass flow output of gas from the heat transfer device, a higher heating value of the fuel, or a higher heating value of the steam, or combinations thereof.

7. The system of claim 1, further comprising a maintenance unit adapted to introduce an anomaly reduction medium based on the normalized efficiency to at least one of the heat transfer device, a fuel for the heat transfer device, and a heat circulation medium in the heat transfer device.

8. The system of claim 7, wherein the anomaly reduction medium provided via the maintenance unit to the heat transfer device includes deposit conditioning additives, combustion catalysts, reflectivity modifiers, or combinations and derivatives thereof.

9. The system of claim 1, wherein the anomaly condition includes at least one of a fouling effect, a slagging effect, or a corrosive effect.

10. The system of claim 1, wherein the efficiency calculator unit computes the initial efficiency based on an output-loss algorithm.

11. The system of claim 1, wherein the heat transfer device comprises a boiler, a furnace, an air preheater, a furnace waterwall, a superheater, a reheater or an economizer.

12. A method for isolating effects of one or more process parameters on performance of a heat transfer device, comprising:
    providing an efficiency correction unit with data representing one or more measurable process parameters or a change in the one or more measurable process parameters of the heat transfer device;
    calculating an initial efficiency of the heat transfer device based on the at least one or more measurable process parameters; and
    applying a normalization model to the data to determine a normalized efficiency of the heat transfer device, wherein the normalized efficiency is adapted to remove effects of a varying load on the heat transfer device, wherein the varying load is configured to utilize an output from the heat transfer device to produce useful work, and wherein the normalized efficiency represents a corrected efficiency, different from the initial efficiency, that isolates the effects of the one or more process parameters of the heat transfer device.

13. The method of claim 12, comprising sampling the data via a plurality of sensors placed proximate to the heat transfer device.

14. The method of claim 12, comprising calculating the normalized efficiency based on at least one of a heating value of a fuel, a flow rate of the fuel, steam pressure, reheat pressure, cold reheat pressure, load factor, or an amount of power generated.

15. The method of claim 12, comprising calculating the normalized efficiency based on corrections effected by stability filters to the initial efficiency.

16. The method of claim 12, wherein the normalized efficiency indicates a drop in efficiency due to the one or more anomaly conditions.

17. The method of claim 12, further comprising providing an anomaly reduction medium via a maintenance unit to the heat transfer device based on the normalized efficiency, a fuel for the heat transfer device, and a heat circulation medium in the heat transfer device, wherein the anomaly reduction medium substantially reduces the one or more anomaly conditions and wherein the anomaly reduction medium includes deposit conditioning additives, combustion catalysts, reflectivity modifiers, or combinations and derivatives thereof.

18. The method of claim 17, comprising mixing the anomaly reduction medium with a fuel for injection into the heat transfer device via the maintenance unit.

19. The method of claim 17, comprising mixing the anomaly reduction medium to a liquid medium inside the heat transfer device.

20. A tangible, machine readable media for isolating effects of one or more process parameters of a heat transfer device, comprising:
    code adapted to to receive data representative of at least one measurable process parameter or a change in the measurable process parameter of the heat transfer device, and configured to compute a normalized efficiency of the heat transfer device, wherein the normalized efficiency represents a corrected efficiency that isolates effects of one or more process parameters on performance of the heat transfer, the efficiency correction unit comprising:
    at least one base load filter adapted to remove effects of a varying load on the heat transfer device, wherein the varying load is configured to utilize an output from the heat transfer device to produce useful work;
    at least one efficiency calculator adapted to compute an initial efficiency of the heat transfer device, wherein the initial efficiency is different from the normalized efficiency; and
    at least one efficiency normalization unit adapted to apply a normalization model to the data to compute the normalized efficiency for the heat transfer device based on the initial efficiency.

21. A system for isolating effects of one or more process parameters on performance of a heat transfer device, comprising:
    an efficiency correction unit adapted to receive data representative of at least one measurable process parameter or a change in the measurable process parameter of the heat transfer device, and configured to compute a normalized efficiency of the heat transfer device, wherein the normalized efficiency is adapted to remove effects of a varying load on the heat transfer device, wherein the varying load is configured to utilize an output from the heat transfer device to produce useful work, and wherein the normalized efficiency represents a corrected efficiency that isolates effects of one or more process parameters on performance of the heat transfer device.

* * * * *